US012572009B2

(12) United States Patent
  Ma

(10) Patent No.: US 12,572,009 B2
(45) Date of Patent: Mar. 10, 2026

(54) THREE-DIMENSIONAL SCANNER, THREE-DIMENSIONAL SCANNING SYSTEM, AND THREE-DIMENSIONAL RECONSTRUCTION METHOD

(71) Applicant: Shining 3D Tech Co., Ltd., Hangzhou (CN)

(72) Inventor: Chao Ma, Hangzhou (CN)

(73) Assignee: Shining 3D Tech Co., Ltd., Hangzhou (CN)

( * ) Notice: Subject to any disclaimer, the term of this patent is extended or adjusted under 35 U.S.C. 154(b) by 329 days.

(21) Appl. No.: 18/286,973

(22) PCT Filed: Apr. 13, 2022

(86) PCT No.: PCT/CN2022/086670
  § 371 (c)(1),
  (2) Date: Oct. 13, 2023

(87) PCT Pub. No.: WO2022/218355
  PCT Pub. Date: Oct. 20, 2022

(65) Prior Publication Data
  US 2024/0192484 A1      Jun. 13, 2024

(30) Foreign Application Priority Data

Apr. 13, 2021    (CN) .......................... 202110393190.8

(51) Int. Cl.
  *G02B 26/10*      (2006.01)
  *A61C 9/00*      (2006.01)
  (Continued)

(52) U.S. Cl.
  CPC .............. *G02B 26/10* (2013.01); *A61C 9/006* (2013.01); *G02B 5/04* (2013.01); *G02B 5/18* (2013.01);
  (Continued)

(58) Field of Classification Search
  CPC . G02B 26/10; G02B 5/04; G02B 5/18; G02B 27/30; A61C 9/006; G06T 15/04;
  (Continued)

(56) References Cited

U.S. PATENT DOCUMENTS 6,503,195 B1    1/2003  Keller et al.
2006/0154198 A1    7/2006  Durbin et al.
  (Continued)

FOREIGN PATENT DOCUMENTS

CN      102074045 A      5/2011
CN      102155925 A      8/2011
  (Continued)

OTHER PUBLICATIONS

Joshua Engelsma et al: "RaspiReader: An Open Source Fingerprint Reader Facilitating Spoof Detection", Aug. 25, 2017, pp. 1-14, XP055575214, retrieved from the internet: https://arxiv.org/pdf/1708.07887.pdf.

(Continued)

*Primary Examiner* — Seung C Sohn
(74) *Attorney, Agent, or Firm* — Jaffery Watson Hamilton & DeSanctis LLP

(57)      ABSTRACT

The present disclosure relates to a three-dimensional (3D) scanner, a 3D system, and a 3D reconstruction method. An emitting device in the three-dimensional scanner is configured to emit preset light rays that include at least two types of monochromatic light rays. A collimating device is configured to perform uniform illumination processing on the preset light rays. A pattern forming device is configured to project the preset light rays undergone uniform illumination processing as a structured light pattern. An optical path adjustment device is configured to change a transmission path of the structured light pattern to project the structured light pattern to a target object and project the structured light (Continued)

pattern modulated by the target object to an image acquisition device. The image acquisition device is configured to perform spectral splitting on the structured light pattern modulated by the target object and acquire split structured light patterns through multiple cameras.

17 Claims, 2 Drawing Sheets

(51) Int. Cl.

| | |
|---|---|
| *G02B 5/04* | (2006.01) |
| *G02B 5/18* | (2006.01) |
| *G02B 27/30* | (2006.01) |
| *G06T 15/04* | (2011.01) |
| *G06T 17/00* | (2006.01) |

(52) U.S. Cl.
CPC .............. *G02B 27/30* (2013.01); *G06T 15/04* (2013.01); *G06T 17/00* (2013.01); *G06T 2210/41* (2013.01); *G06T 2210/56* (2013.01)

(58) Field of Classification Search
CPC . G06T 17/00; G06T 2210/41; G06T 2210/56; G06T 7/521; G01B 11/2513; G01B 11/2518; G01B 11/2545; G01B 11/2509; G01B 11/25
See application file for complete search history.

(56) References Cited

U.S. PATENT DOCUMENTS

2009/0322859  A1    12/2009  Shelton et al.

2014/0028800  A1     1/2014  Tin
2014/0152769  A1*    6/2014  Atwell ................. H04N 13/207
                                                              348/46
2016/0377417  A1*   12/2016  Jovanovski ........ G01B 11/2513
                                                              348/136

FOREIGN PATENT DOCUMENTS

| | | | |
|---|---|---|---|
| CN | 104570315 | A | 4/2015 |
| CN | 105662632 | A | 6/2016 |
| CN | 102980526 | A | 8/2016 |
| CN | 109283186 | A | 1/2019 |
| CN | 109489583 | A | 3/2019 |
| CN | 110441981 | A | 11/2019 |
| CN | 112985307 | A | 6/2021 |
| CN | 111336949 | A | 6/2023 |
| JP | H10170239 | A | 6/1998 |
| JP | 2002048523 | A | 2/2002 |
| JP | 2003532062 | A | 10/2003 |
| JP | 2011504230 | A | 2/2011 |
| JP | 2019523064 | A | 8/2019 |
| JP | 2020180827 | A | 11/2020 |
| WO | 0181859 | A1 | 11/2001 |
| WO | 2009063088 | A2 | 5/2009 |
| WO | 2011077203 | A2 | 6/2011 |
| WO | 2020103822 | A1 | 5/2020 |

OTHER PUBLICATIONS

International Searching Authority (ISA/CN), International Search Report for PCT/CN2022/086670, Jul. 4, 2022, 4 pages.
International Searching Authority (ISA/CN), Written Opinion for PCT/CN2022/086670, Jul. 4, 2022, 5 pages.

* cited by examiner

THREE-DIMENSIONAL SCANNER, THREE-DIMENSIONAL SCANNING SYSTEM, AND THREE-DIMENSIONAL RECONSTRUCTION METHOD

The present disclosure application is a national stage application of International Application PCT/CN2022/086670, filed on Apr. 13, 2022, which claims priority to Chinese Patent Application 2021103931908, entitled "THREE-DIMENSIONAL SCANNER, SYSTEM, AND 3D RECONSTRUCTION METHOD, " filed with the Chinese Patent Office on Apr. 13, 2021, each of which is incorporated herein by reference in its entirety.

TECHNICAL FIELD

The embodiments of the present disclosure relate to the technical field of three-dimensional (3D) scanning, and in particular relate to a 3D scanner, a 3D system, and a 3D reconstruction method.

BACKGROUND ART

At present, internationally, means of acquiring cast mold data in the field of dental diagnosis and treatment have gradually changed from impression 3D scanning to intraoral 3D scanning. The intraoral scanning technology mainly applies to a three-dimensional scanner, also known as an oral digital impression device. It is a device that uses a probe-in type optical scanning head to directly scan the oral cavity of a patient to acquire 3D morphology and color texture information of soft and hard tissue surfaces such as teeth, gums, and mucosa in the oral cavity.

The intraoral scanning technology is based on the principle of active structured light triangulation imaging, that is, a digital projection system is utilized to protect an active light pattern, and a camera acquisition system is utilized to acquire the pattern and then perform 3D reconstruction and splicing by algorithm processing so as to obtain the tooth image of the patient. However, in the related art, a time encoding and decoding based 3D reconstruction mode is adopted, which requires acquiring tooth images at multiple times and encoding, decoding, and reconstructing them on different time series. Moreover, such mode is difficult to achieve small-size handheld scanning, so it cannot be applied to the field of 3D scanning in the oral cavity. In addition, the time encoding based 3D reconstruction method also requires the support of a high-frame-rate camera and a high-speed algorithm, which leads to high generation costs for 3D scanning devices and is not conducive to promotion and use.

SUMMARY OF THE INVENTION

(I) Technical Problems to be Solved

In order to solve all or part of the technical problems above, an embodiment of the present disclosure provides a three-dimensional (3D) scanner, a 3D system, and a 3D reconstruction method to achieve the reduction of hardware costs required for 3D reconstruction. Moreover, 3D reconstruction can be performed by using only a 2D image captured in a single instance, so that the reconstruction efficiency of an image is improved and the cost is greatly reduced.

(II) Technical Solutions

The present disclosure provides a three-dimensional scanner, which includes a projection device, an image acquisition device, and an optical path adjustment device.

The projection device includes an emitting device, a collimating device, and a pattern forming device;

The emitting device is configured to emit preset light rays. The preset light rays include at least two types of monochromatic light rays;

The collimating device is configured to perform uniform illumination processing on the preset light rays.

The pattern forming device is configured to project the preset light rays undergone uniform illumination processing as a structured light pattern.

The optical path adjustment device is configured to change a transmission path of the structured light pattern to project the structured light pattern to a target object and project the structured light pattern modulated by the target object onto the image acquisition device.

The image acquisition device is configured to spectrally split the structured light pattern modulated by the target object and acquire multiple split structured light patterns through different cameras for 3D reconstruction.

The present disclosure provides a 3D scanning system including a three-dimensional scanner and an image processing device in communication connection with the three-dimensional scanner.

The three-dimensional scanner includes a projection device, an image acquisition device, and an optical path adjustment device. The projection device includes an emitting device, a collimating device, and a pattern forming device.

The three-dimensional scanner emits preset light rays through the emitting device. The preset light rays are processed for uniform illumination using collimating light. The preset light rays undergone uniform illumination processing are projected as a structured light pattern through the pattern forming device. A transmission path of the structured light pattern is changed through the optical path adjustment device to project the structured light pattern onto a target object. The structured light pattern modulated by the target object is projected to the image acquisition device. The structured light pattern modulated by the target object is spectrally split through the image acquisition device. A plurality of spectrally split structured light patterns are captured through different cameras for 3D reconstruction. The preset light rays include at least two types of monochromatic light rays.

The image processing device is configured to receive the plurality of spectrally split structured light patterns scanned by the three-dimensional scanner and perform 3D reconstruction based on the plurality of split structured light patterns.

An embodiment of the present disclosure further provides a 3D reconstruction method applied to the abovementioned image processing device. The method includes:

acquiring a plurality of spectrally split structured light patterns obtained through the three-dimensional scanner; and performing 3D reconstruction based on preset coding rules, a preset coding table of a structured light stripe pattern, and the spectrally split structured light patterns.

(III) Beneficial Effects

Compared with the related art, the technical solution provided by the embodiment of the present disclosure has the following advantages:

According to the embodiment of the present disclosure, since the multiple captured split structured light patterns are based on a spatial coding form, 3D reconstruction of the target object can be realized only by a 2D image captured in a single instance. Therefore, dynamic projection is not required, the frame rate and algorithm operation cost of the camera in the three-dimensional scanner is greatly reduced, the speed of dynamic scanning in the oral cavity is increased, the size of the camera required by the three-dimensional scanner is reduced, and the three-dimensional scanner is suitable for scanning the oral cavity to acquire the tooth image. In addition, since the 3D reconstruction of the target object can be realized only by the 2D image captured in a single instance, the acquisition time difference between a reconstructed image and a texture pattern of the three-dimensional scanner is shortened, and the time for projection and shooting of the 3D reconstruction of the target object is reduced. Since the three-dimensional scanner uses colors as spatial coding information, the spatial coding information in a color form is easy to identify, and the identification accuracy is improved. Moreover, since the color characteristics of the generated monochromatic light rays (such as blue stripes) in the split structured light patterns and monochromatic light rays (such as blue texture patterns) subjected to white light splitting are relatively prominent, the quality of the reconstructed image may be improved by performing 3D reconstruction based on the blue-green stripes and the color stripes and performing 3D reconstruction based on blue texture patterns and red-green texture patterns. In the case of enamel on the surface of the tooth, the three-dimensional scanner may also separate the reflected light of the enamel, so that the influence of the reflected light and scattered light of the enamel on the quality of the reconstructed image is avoided.

It is to be understood that both the foregoing general description and the following detailed description are exemplary and explanatory only and are not restrictive of the present disclosure.

BRIEF DESCRIPTION OF THE DRAWINGS

The accompanying drawings here are incorporated into the description and form a part of this description, showing embodiments that comply with the present disclosure, and are used together with the description to explain the principles of the present disclosure.

In order to provide a clearer explanation of the disclosed embodiments or technical solutions in the related art, a brief introduction will be given to the accompanying drawings required in the embodiments or description of the related art. It is evident that for those of ordinary skill in the art, other accompanying drawings may also be obtained based on these drawings without any creative effort.

DETAILED DESCRIPTION

Figure 1:
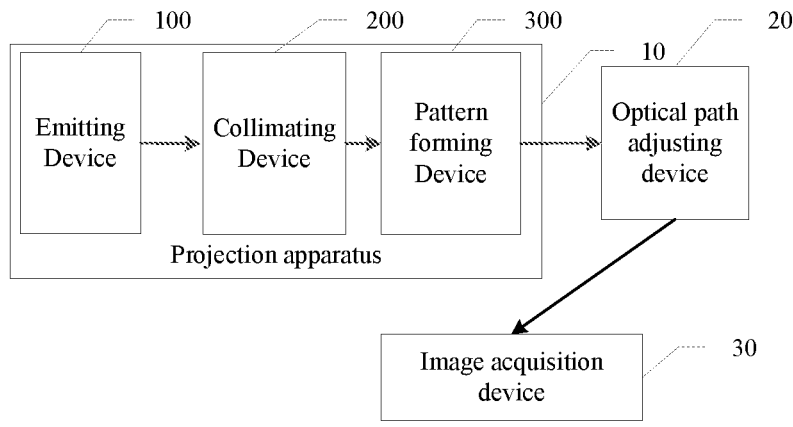
FIG. 1 is a schematic structural diagram of a three-dimensional scanner according to one or more embodiments of the present disclosure.

For the purpose of making objectives, technical solutions, and advantages of the present disclosure clearer, the technical solutions in this disclosed embodiment will be clearly and completely described below. Definitely, the described embodiments are merely part of the embodiments of the present discourse and not all the embodiments. Based on the embodiments of the present disclosure, all other embodiments obtained by those of ordinary skilled in the art without making any inventive effort fall within the protection scope of the present disclosure.

In the related art, when the three-dimensional scanner is used for acquiring an image from the oral cavity, a probe-in type optical scanning head of the three-dimensional scanner is probed into the oral cavity by a 3D scanning technology, and then the oral cavity of a patient is directly scanned so as to obtain 3D morphology and color texture information of soft and hard tissue surfaces such as teeth, gums, and mucosa in the oral cavity. Due to the narrow environment in the oral cavity, the size of the probe-in type optical scanning head is limited; and generally, the size of the probe-in type optical scanning head is controlled to be within 30 mm, so that the probe-in type optical scanning head can only obtain tooth images of less than two teeth at most at a time. However, in the dental industry, all tooth and gum data in the oral cavity need to be captured in the tooth designing and making process, and it is needed to stitch the tooth images captured at a time to form 3D space data consistent with all the teeth.

In order to improve the single scanning rate and the splicing rate of the tooth images, on one hand, it is needed to improve the single scanning efficiency, and on the other hand, it is also needed to improve the splicing success rate and the splicing efficiency. Factors for determining the single scanning time are often related to the execution time of a structured light encoding and decoding algorithm, and it is usually considered to perform decoding on the whole image during structured light coding pattern design. For example, methods of time phase unfolding, space phase unfolding and the like are adopted, phase unfolding is needed to carry out to obtain a real absolute phase based on acquiring a folding phase, and therefore the periodicity problem of the folding phase is solved. In order to unfold the phase globally, it is needed to consider multiple image sequences or a complex-based space coding process. However, the abovementioned encoding and decoding process will greatly prolong the single scanning time. In the case of reducing the single scanning time, it is needed to decrease the data size of the sequence images and reduce the decoding algorithm time, but the image quality will be reduced in this way. Therefore, this scanning mode cannot achieve the advantages of both short scanning time and high quality of the scanned image.

In addition, in the process of encoding and decoding the captured image by the structured light encoding and decoding algorithm, it is needed to consider the neighborhood pixel information in the process of acquiring a single pixel encoding value; the more the considered neighborhood pixels are, the higher the decoding accuracy is; and therefore, it is needed to provide sufficient encoding information in the neighborhood pixels. However, the tooth surface has abundant contour information, such as gingival sulcus, slits between teeth, adjacent tooth shielding, and narrow tooth space, and such contour information causes a large amount of discontinuous surface information and structured light patterns in the obtained tooth image, so that if the neighborhood pixel information is lost, decoding of the pixel position will fail, namely, the integrity of the region data is reduced.

In addition to the described defects, when the three-dimensional scanner is used for scanning the image in the oral cavity, the specific enamel on the tooth surface brings a great challenge to an optical measurement method. The enamel has high reflection, transmitted light, and diffused light. The high reflection and the diffused light may seriously reduce the overall signal-to-noise ratio of object imaging and the intensity of light and change the incident point of the light to influence the depth information of 3D reconstruction. To solve these problems, in the actual operation process, it is tried to carry out solid powder spraying or liquid coating on the tooth and the gingiva, the powder or the coating will shield incident light, and the 3D information of the surface of the tooth below the powder layer can be restored by controlling the thickness of the powder or the coating. However, the powder and the coating are inconvenient to use, for example, a patient is allergic to the powder and the coating or is difficult to accept the powder and the coating, which prolongs the whole scanning time; and the thickness value of the powder or the coating will directly influence the precision of the 3D data, which will cover the defects of the tooth surface, and the real tooth color cannot be obtained. Obviously, when the three-dimensional scanner is used for scanning the teeth, the enamel with the high reflection characteristic will influence the image quality of the teeth.

In conclusion, in the process of scanning the oral cavity by the three-dimensional scanner to obtain the tooth image, the scanning time cost is high, and small-size handheld scanning is difficult to realize. Moreover, a high-frame-rate camera and a high-speed algorithm are needed for support, the required cost is high, and popularization and use are not facilitated. In addition, a method for acquiring an image based on a microscopic confocal 3D imaging principle has the disadvantages that because the number of lenses is large, the precision is high; and moving parts are arranged, which causes high hardware processing cost.

To address the aforementioned problems, an embodiment of the present disclosure provides a three-dimensional (3D) scanner, a system for 3D scanning, and a 3D reconstruction method. The hardware costs required by 3D reconstruction can be reduced. Moreover, 3D reconstruction can be performed using only a 2D image captured in a single instance, significantly improving the efficiency of image reconstruction.

Embodiment 1

FIG. 1 is a structural schematic diagram of a three-dimensional scanner. As shown in FIG. 1, the three-dimensional scanner includes a projection device 10, an optical path adjustment device 20, and an image acquisition device 30.

The projection device 10 includes an emitting device 100, a collimating device 200, and a pattern forming device 300.

The emitting device 100 is configured to emit preset light rays. The preset light rays may include at least two types of monochromatic light rays.

The collimating device 200 is configured to perform uniform illumination processing on the preset light rays.

The pattern forming device 300 is configured to project the preset light rays undergone uniform illumination processing as a structured light pattern.

The optical path adjustment device 20 is configured to change a transmission path of the structured light pattern to project the structured light pattern to a target object and project the structured light pattern modulated by the target object to the image acquisition device 30.

The image acquisition device 30 is configured to perform spectral splitting on the structured light pattern modulated by the target object. The image acquisition device 30 is further configured to acquire multiple split structured light patterns through different cameras for 3D reconstruction.

In this embodiment of the present disclosure, when the emitting device 100 emits the preset light rays, the emitting device with the corresponding color may be configured according to the emitting requirement. For example, in the case of emitting blue light rays, an emitting device capable of emitting the blue light rays is configured; and in the case of emitting green light rays, an emitting device capable of emitting the green light rays is configured. According to this embodiment of the present disclosure, the preset light rays include at least two types of monochromatic light rays, and the preset light ray including at least the blue light rays and the green light rays is taken as an example to specifically describe the solution of this embodiment of the present disclosure.

In an optional embodiment, the emitting device 100 includes at least two groups of light source modules and at least one color mixing device. Each group of light source modules is configured to emit a type of monochromatic light rays.

The color mixing device is configured to combine the light rays emitted by the at least two groups of light source modules into an optical path.

Specifically, each group of light source modules may be formed by combining a laser emitter and a cylindrical lens, may also be formed by combining Digital Light Processing (DLP) and a cylindrical lens, and may further be formed by combining Liquid Crystal on Silicon (LCOS) and a cylindrical lens. The color mixing device may be a color mixing mirror or any other device with color mixing capabilities.

Figure 2:
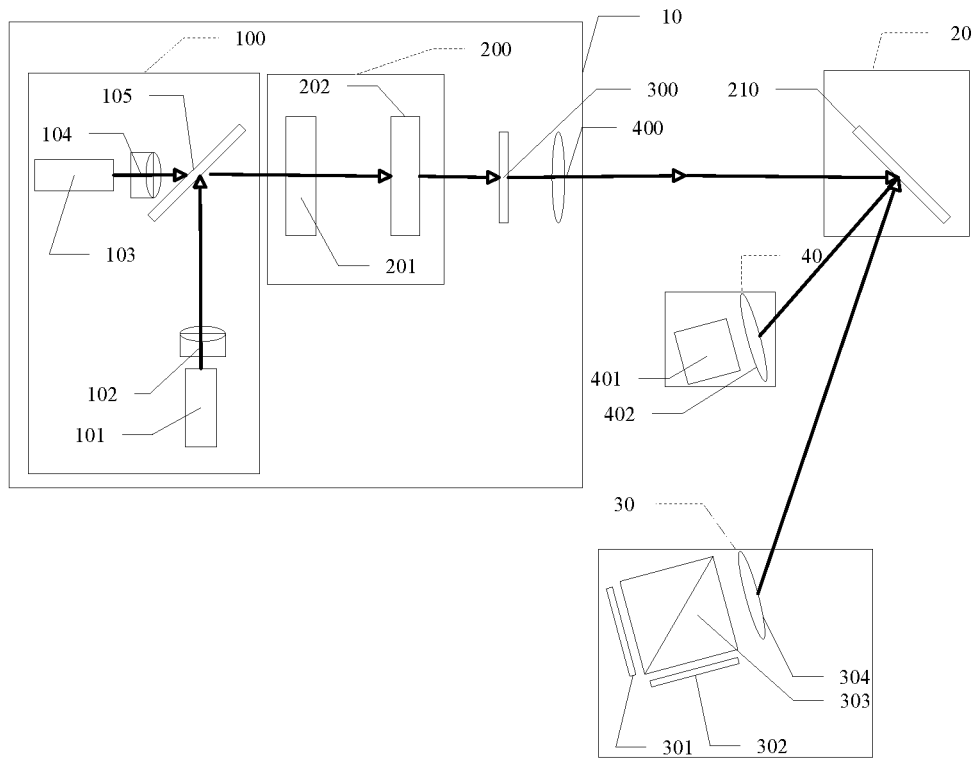
FIG. 2 is a schematic structural diagram of another three-dimensional scanner according to one or more embodiments of the present disclosure.

FIG. 2 is a structural schematic diagram of another three-dimensional scanner and is adopted for specific description. Each group of light source modules of the emitting device 100 includes a laser emitter and a cylindrical lens. The color mixing device is a color mixing mirror. A first laser emitter 101 is arranged below a first cylindrical lens 102. First light rays are emitted through the first laser emitter 101 and are converged through the first cylindrical lens 102. A second laser emitter 103 is arranged on the left side of a second cylindrical lens 104. Second light rays are emitted through the second laser emitter 103 and are converged through the second cylindrical lens 104. Then, the converged first light rays and the converged second light rays are combined into a single optical path by a color mixing mirror 105 to form preset light rays. One of the first light rays and the second light rays may be blue light rays, and the other one may be green light rays.

It is to be noted that the laser emitted by the laser emitter has the advantages of good directionality, extremely high brightness, pure color, and good coherence, which is beneficial to obtaining a tooth image with high quality. The advantage of converging the light rays by the cylindrical lens is that the light rays emitted by the laser emitter are prevented from being dispersed, thereby improving the utilization rate of the laser. In addition, compared with DLP and LCOS, the emitting device composed of the laser emitting device, the cylindrical lens, and the color mixing device is low in cost, and therefore the hardware cost for the three-dimensional scanner is reduced.

In another optional embodiment, the emitting device 100 may further include three or more groups of light source modules and at least one color mixing device. Specifically, each group of light source modules is correspondingly arranged, and can be implemented referring to the afore-mentioned description. Each color mixing device combines two or more types of light rays, and the combined light rays serve as the preset light rays.

Due to the inherent coherence of the laser, diffraction spots can easily appear in the projected pattern. It is neces-sary to provide a decoherence uniform illumination system. A small motor driving phase modulation element, a light beam coupling system, and an optical rod may be configured in the emitting device 100. Specifically, the small motor driving phase modulation element rotates around a rotating shaft at a certain speed to modulate the laser phase in real time. The modulated preset light rays are incident on the optical rod through the light beam coupling system. The incident light beams are reflected and mixed multiple times through the inner surface of the optical rod, and then a light field with uniform intensity is outputted at the output end of the optical rod to uniformly project the preset light rays.

In this embodiment of the disclosure, the collimating device 200 includes at least one compound-eye lens. The compound-eye lens is configured to perform uniform illu-mination processing on the preset light rays and project the preset light rays that have undergone uniform illumination processing to the pattern forming device.

According to the specific description based on the struc-tural schematic diagram of another three-dimensional scan-ner in FIG. 2, the collimating device 200 includes a first compound-eye lens 201 and a second compound-eye lens 202. The first compound-eye lens 201 and the second compound-eye lens 202 are arranged between the emitting device 100 and the pattern forming device 300 in parallel. The preset light rays are processed for uniform illumination through the collimating device 200. The preset light rays may be uniformly illuminated at an energy level, achieving a higher light energy utilization rate and broader-area uni-form lighting. As a result, the uniform preset light rays can be favorably projected, preventing the occurrence of diffrac-tion spots and improving the utilization rate of the light ray.

In this embodiment of the present disclosure, the pattern forming device 300 is a color grating sheet.

The color grating sheet is configured to generate a struc-tured light pattern projected in a stripe pattern through the preset light rays undergone uniform illumination processing.

In this embodiment of the present disclosure, the projec-tion device 10 may further include a projection lens 400. The preset light rays projected in the stripe pattern can be transmitted through the projection lens 400.

In this embodiment of the present disclosure, the optical path adjustment device 20 may include a light reflecting device. The preset light rays projected in the stripe pattern by the projection lens are reflected to the target object through the light reflecting device. The light reflecting device may be a reflector or any other device with specific light-reflecting functions. The target object may include teeth, gums, and the like.

As shown in the structural schematic diagram of another three-dimensional scanner in FIG. 2, the color grating sheet 300, the projection lens 400, and the reflector 210 are sequentially arranged on the right side of the collimating device 200 along an optical path transmission path from the emitting device 100 to the collimating device 200.

Specifically, a MASK pattern is arranged on the color grating sheet 300. The types of color in the MASK pattern on the color grating sheet 300 may correspond one-to-one with the types of wavebands in the transmitted light rays.

That is, the MASK pattern on the color grating sheet 300 may include at least blue and green. The preset light rays projected in the stripe pattern may be generated based on the transmitted preset light rays. Furthermore, the preset light rays projected in the stripe pattern may pass through the projection lens 400. The preset light rays projected in the stripe pattern are converged, enabling the transmitted preset light rays to be projected onto the reflector 210. A transmis-sion path of the preset light rays can be changed by the reflector 210. The preset light rays with the changed trans-mission path are projected onto the target object.

In this embodiment of the present disclosure, the image acquisition device 30 includes a color separating prism, a monochrome camera, and a color camera.

The color separating prism may split the structured light pattern into split beams of light rays. One of the split light beams includes monochromatic light rays that may be captured by the monochrome camera. Another split light beam may include lights rays that may be captured by the color camera. Specifically, the monochromatic light rays captured through the monochrome camera may be a blue stripe pattern. The light beam captured by the color camera may be a green stripe pattern. The color separating prism may be a right-angle two-channel color separating prism and may also be a color separating prism of any other shapes with color-splitting capabilities.

Optionally, the image acquisition device 30 may also include an imaging lens.

According to the specific description based on the struc-tural schematic diagram of another three-dimensional scan-ner in FIG. 2, the image acquisition device 30 is arranged obliquely below the optical path adjustment device 20. The image acquisition device 30 includes an imaging lens 304, a color separating prism 303, a monochrome camera 301, and a color camera 302. Specifically, the structured light pattern modulated by the target object is projected to the imaging lens 304 in the image acquisition device 30. The transmitted structured light pattern is divided into two light beams through the color separating prism 303. One of the light beams includes the blue stripe pattern captured through the monochrome camera 301, and the other light beam includes the green stripe pattern captured through the color camera 302.

Further, after the three-dimensional scanner acquires the monochromatic light rays after splitting the structured light pattern, 3D reconstruction is performed based on the split monochromatic light rays. Specifically, 3D reconstruction may be performed according to the blue stripe pattern and the green stripe pattern obtained by spectral splitting.

In this embodiment of the present disclosure, the three-dimensional scanner may further include an illumination device. The illumination device is configured to project white light onto the target object. The optical path adjust-ment device is further configured to change a transmission path of the white light to reflect the white light onto the target object.

Specifically, the illumination device may include a white light source and a converging lens. The white light source is configured to emit white light. The converging lens is configured to converge the white light and project the converged white light to the optical path adjustment device.

Further, the color separating prism is further configured to spectrally split the white light that has been modulated by the target object. One of the split light beams includes a monochromatic texture pattern that may be captured by the monochrome camera. Another split light beam may be captured by the color camera. The texture patterns from the two split light beams after splitting the white light are used for texture reconstruction. Specifically, the texture patterns from the two split light beams may include a blue texture pattern and a red-green texture pattern.

According to the specific description based on the structural schematic diagram of another three-dimensional scanner in FIG. 2, an illumination device 40 is arranged at the lower left part of the optical path adjustment device 20 and includes a white light source 401 and a converging lens 402. The white light source 401 is configured to emit white light. The converging lens 402 is configured to converge the white light and project the converged white light to the optical path adjustment device 20. The optical path adjustment device 20 changes the transmission path of the white light to reflect the white light onto the target object. Further, the exposure modulated by the target object is projected to the imaging lens 304 in the image acquisition device 30, and the transmitted structured light pattern is split into two light beams through the color separating prism 303. One of the light beams is the blue texture pattern captured by the monochrome camera 301. The other light beam is a red-green texture pattern captured by the color camera 302.

Further, after the three-dimensional scanner acquires monochromatic light rays after splitting the white light, texture reconstruction is performed based on the two texture patterns after splitting. Specifically, texture reconstruction may be performed according to the split blue texture pattern and the split red-green texture pattern.

It is to be noted that the three-dimensional scanner may further include a time sequence control circuit. The projection device is controlled to emit the preset light rays through the time sequence control circuit, and the illumination device is controlled to emit white light. The preset light rays and the white light may be emitted at the same time or emitted in sequence. Preferably, the preset light rays are emitted first and then the white light is emitted according to this embodiment.

According to the three-dimensional scanner provided by this embodiment of the present disclosure, since the multiple captured split structured light patterns are based on a spatial coding form, 3D reconstruction of the target object can be realized by only using a 2D image captured in a single instance. Therefore, the requirement of dynamic projection is eliminated, the frame rate and algorithm operation costs of the camera in the three-dimensional scanner are greatly reduced, the speed of dynamic scanning in the oral cavity is increased, the size of the camera required by the three-dimensional scanner is reduced, and the three-dimensional scanner is suitable for scanning the oral cavity to acquire the tooth image. In addition, since the 3D reconstruction of the target object can be realized only by the 2D image captured in a single instance, the acquisition time difference between a reconstructed image and a texture pattern of the three-dimensional scanner is shortened, and the time for projection and shooting of the 3D reconstruction of the target object is reduced. Since the three-dimensional scanner uses colors as spatial coding information, the spatial coding information in a color form is easy to identify, and the identification accuracy is improved. Moreover, since the color characteristics of the generated monochromatic light rays (such as blue stripes) in the split structured light patterns and monochromatic light rays (such as blue texture patterns) subjected to white light splitting are relatively prominent, the quality of the reconstructed image may be improved by performing 3D reconstruction based on the blue-green stripes and the color stripes and performing 3D reconstruction based on blue texture patterns and red-green texture patterns. In the case of enamel on the surface of the tooth, the three-dimensional scanner may also separate the reflected light of the enamel, so that the influence of the reflected light and scattered light of the enamel on the quality of the reconstructed image is avoided.

Embodiment 2

Figure 3:
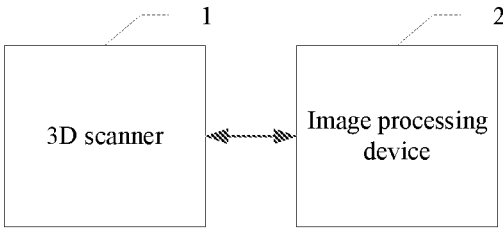
FIG. 3 is a schematic structural diagram of a 3D scanning system according to one or more embodiments of the present disclosure.

FIG. 3 is a schematic diagram showing the structure of a 3D scanning system. As shown in FIG. 3, the 3D scanning system includes a three-dimensional scanner 1 and an image processing device 2 in communication connection with the three-dimensional scanner 1.

The three-dimensional scanner 1 includes a projection device, an image acquisition device, and an optical path adjustment device. The projection device includes an emitting device, a collimating device, and a pattern forming device.

The three-dimensional scanner 1 emits preset light rays through the emitting device and performs uniform illumination processing on the preset light rays through the collimating device. The uniformly illuminated preset light rays are projected as a structured light pattern through the pattern forming device. A transmission path of the structured light pattern is changed through the optical path adjustment device to project the structured light pattern to a target object. The structured light pattern modulated by the target object is projected to the image acquisition device. The structured light pattern modulated by the target object is split through the image acquisition device. Multiple split structured light patterns are captured through different cameras for 3D reconstruction. The preset light rays include at least two types of monochromatic light rays.

The image processing device 2 is configured to receive the multiple split structured light patterns scanned by the three-dimensional scanner and perform 3D reconstruction based on the multiple split structured light patterns.

Optionally, the emitting device in the three-dimensional scanner 1 includes at least two groups of light source modules and at least one color mixing device.

Each group of light source modules is configured to emit a type of monochromatic light rays.

The color mixing device is configured to combine the light rays emitted by the at least two groups of light source modules into an optical path.

Optionally, the collimating device in the three-dimensional scanner 1 includes at least one compound-eye lens.

The compound-eye lens is configured to perform uniform illumination processing on the preset light rays to project the preset light rays undergone uniform illumination processing onto the pattern forming device.

Optionally, the pattern forming device in the three-dimensional scanner 1 is a color grating sheet.

The color grating sheet is configured to generate a structured light pattern projected in a stripe pattern through the preset light rays undergone uniform illumination processing.

Optionally, the image acquisition device in the three-dimensional scanner 1 includes a color separating prism, a color camera, and a monochrome camera.

The color separating prism splits the structured light pattern. After splitting, one of the split light beams is monochromatic light rays that may be captured by the monochrome camera. Another split light beam is captured through the color camera.

Optionally, the three-dimensional scanner further includes an illumination device.

The illumination device projects white light onto the target object.

The optical path adjustment device is further configured to change a transmission path of the white light to reflect the white light onto the target object.

The image acquisition device is further configured to perform spectral splitting on the white light modulated by the target object and perform multi-camera acquisition on the two light beams split from the white light.

Correspondingly, the image processing device 2 is further configured to perform texture reconstruction based on the two light beams split from the white light.

Further, to acquire all data of tooth and gum in the oral cavity, it might be necessary to stitch each determined frame of 3D reconstructed image and each determined frame of texture reconstructed image. Therefore, the image processing device 2 is further configured to stitch the 3D reconstructed images obtained by 3D reconstruction to obtain a target reconstructed image of the target object and map a texture reconstructed image obtained by texture reconstruction to obtain a target texture pattern of the target object.

Specifically, the 3D reconstructed images are stitched based on the image information of the 3D reconstructed images to obtain the 3D reconstructed image of the target object. The texture-reconstructed image is mapped based on the texture information of the texture-reconstructed images to obtain the texture-reconstructed image corresponding to the target. The image information includes but is not limited to the gray values and the morphological characteristics of the 3D reconstructed image or the texture reconstructed image.

According to the technical solutions provided by this embodiment, since the three-dimensional scanner uses colors as spatial coding information, the spatial coding information in a color form is easy to identify, and the identification accuracy is improved. 3D reconstruction and texture reconstruction of the target object can be achieved by only using a 2D image captured in a single instance, and the reconstruction efficiency of 3D reconstruction and texture reconstruction and the image quality of the reconstructed image can be improved. The quality of the generated 3D reconstructed image and the texture reconstructed image is high, and the generation speed is high, so the image splicing and texture splicing efficiency and splicing precision may be improved.

The description above is subjected to exemplary explanation with reference to the structural schematic diagram of the three-dimensional scanner in FIG. 2. As shown in FIG. 2, the three-dimensional scanner 1 includes a projection device, an illumination device, an image acquisition device, and an optical path adjustment device. The projection device includes an emitting device, a collimating device, a pattern forming device, and a projection lens.

The emitting device includes two light source modules and a color mixing device. One of the two light source modules is a blue light source module for projecting blue light, and the other light source module is a green light source module for projecting green light. The blue light source module includes a blue light source and a cylindrical lens. The green light source module includes a green light source and a cylindrical lens. The color mixing device is a color mixing mirror. The blue light source module faces one face of the color mixing mirror, and the green light source module faces the other face of the color mixing mirror. Green light rays projected by the green light source module and blue light rays projected by the blue light source module are transmitted to the color mixing mirror and combined to an optical path through the color mixing mirror, and then a beam of blue-green light rays is combined. The collimating device includes a first compound-eye lens and a second compound-eye lens. The pattern forming device is a color grating sheet.

The illumination device includes a white light source and a converging lens.

The image acquisition device includes an imaging lens, a color separating prism, a color camera, and a monochrome camera. The color separating prism is a right-angle two-channel color separating prism. One channel is a blue light channel, and the other channel is a red-green light channel. The color camera faces the face, corresponding to the red-green light channel, of the right-angle two-channel color separating prism. The monochrome camera faces the face, corresponding to the blue light channel, of the right-angle two-channel color separating prism.

The optical path adjustment device is a reflector. The projection device, the illumination device, and the image acquisition device all face the optical path adjustment device.

The blue light source module and the green light source module work synchronously for projection. The blue light rays projected by the blue light source module and the green light rays projected by the green light source module are combined into a beam of blue-green light rays through the color mixing lens. The beam of blue-green light rays is transmitted to the first compound-eye lens, the second compound-eye lens, the color grating sheet, the projection lens, and the reflector in sequence and then is projected outwards in a form of a blue-green stripe structured light pattern. That is, the emitting device projects the blue-green stripe structured light pattern.

The emitting device projects the blue-green stripe structured light pattern, and the blue-green stripe structured light pattern is reflected to the target object through the reflector and is modulated and deformed by the target object. The surface image of the target object is reflected by the reflector and transmitted to the image acquisition device.

A surface image of the target object is transmitted to the imaging lens and the right-angle two-channel color separating prism in sequence. The right-angle two-channel color separating prism splits the surface image of the target object. The blue light rays are transmitted to the monochrome camera through the blue light channel, and the monochrome camera acquires the deformed blue stripe structured light pattern. The green light rays are transmitted to the color camera through the red-green light channel, and then the color camera acquires the deformed green stripe structured light pattern.

The white light source works and projects and is reflected onto the target object through the reflector. The surface image of the target object is reflected by the reflector and transmitted to the image acquisition device.

The surface image of the target object is transmitted to the imaging lens and the right-angle two-channel color separating prism in sequence. The right-angle two-channel color separating prism splits the surface image of the target object. The blue light rays are transmitted to the monochrome camera through the blue light channel. The monochrome camera acquires a blue texture pattern. The red-green light rays are transmitted to the color camera through the red-green light channel, and the color camera acquires a red-green texture pattern.

The emitting device and the illumination device alternately work and project. The image acquisition device and the emitting device may work synchronously. The image acquisition device and the illumination device may work synchronously.

A 3D scanning system includes a three-dimensional scanner and an image processing device in communication connection with the three-dimensional scanner. The image processing device acquires the blue stripe structured light pattern and the green stripe structured light pattern captured through the three-dimensional scanner for 3D reconstruction. The image processing device acquires the blue texture pattern and the red-green texture pattern captured through the three-dimensional scanner for texture reconstruction.

The image processing device is preset with calibration parameters of the three-dimensional scanner, coding rules, and coding tables for the blue-green stripe structured light pattern. The calibration parameters include internal parameters and external parameters of the emitting device and the image acquisition device, and the light plane of each stripe in the blue-green stripe structured light pattern.

The image processing device executes the following method to perform true color 3D reconstruction of the target object:

acquiring the blue stripe structured light pattern and the green stripe structured light pattern captured by the three-dimensional scanner;

acquiring a preset coding rule;

determining a coding table for the blue stripe structured light pattern according to the preset coding rule;

determining a coding table for the green stripe structured light pattern according to the preset coding rule;

determining a combined coding table by combining the coding table for the blue stripe structured light pattern and the coding table for the green stripe structured light pattern based on the corresponding co-located pixels;

acquiring a preset coding table for the blue-green stripe structured light pattern;

matching the combined coding table with the preset coding table of the blue-green stripe structured light pattern, and determining a light plane corresponding to each stripe in the blue stripe structured light pattern;

acquiring internal parameters and external parameters of the emitting device and the image acquisition device;

reconstructing a point cloud of the target object in a 3D manner through the blue stripe structured light pattern, the light plane corresponding to each stripe in the blue stripe structured light pattern, and the internal and external parameters of the emitting device and the image acquisition device;

acquiring the blue texture pattern and the red-green texture pattern captured through the three-dimensional scanner;

determining a true color texture pattern by combining the blue texture pattern and the red-green texture pattern based on the corresponding pixels located at the same position; and performing texture pattern mapping on the point cloud and the true color texture pattern based on the blue strip pattern and the same-position pixels of the texture pattern to obtain a true color 3D model of the target object.

Embodiment 3

Figure 4:
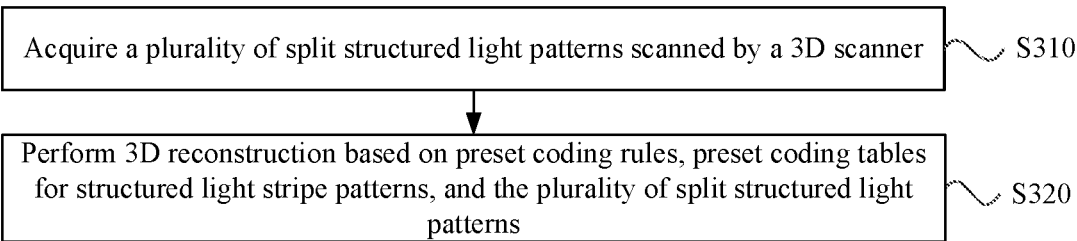
FIG. 4 is a schematic flowchart of a 3D reconstruction method according to one or more embodiments of the present disclosure.

FIG. 4 is a flowchart of a 3D reconstruction method. The 3D reconstruction method is applied to the image processing device in the abovementioned embodiment. The image processing device may be terminal equipment such as a desktop computer, a mobile phone, or a laptop computer. As shown in FIG. 4, the 3D reconstruction method includes the following steps.

S310: Multiple split structured light patterns scanned by the three-dimensional scanner are captured.

As described in the foregoing embodiment, the three-dimensional scanner includes the projection device, the image acquisition device, and the optical path adjustment device. The projection device includes the emitting device, the collimating device, and the pattern forming device. The emitting device is configured to emit preset light rays. The preset light rays include at least two types of monochromatic light rays. The collimating device is configured to perform uniform illumination processing on the preset light rays. The pattern forming device is configured to project the preset light rays undergone uniform illumination processing as a structured light pattern. The optical path adjustment device is configured to change the transmission path of the structured light pattern to project the structured light pattern to the target object and project the structured light pattern modulated by the target object to the image acquisition device. The image acquisition device is configured to perform spectral splitting on the structured light pattern modulated by the target object and acquire multiple split structured light patterns through different cameras.

Further, according to the three-dimensional scanner, the multiple split structured light patterns captured through the cameras are transmitted to the image processing device, and the image processing device processes the multiple split structured light patterns for 3D reconstruction.

S320: 3D reconstruction is performed based on preset coding rules, preset coding tables for structured light stripe patterns, and multiple split structured light patterns.

According to this embodiment of the present disclosure, the 3D reconstruction method includes: determining a code corresponding to each light beam after splitting the structured light patterns according to the preset coding rules to obtain a coding table corresponding to each light beam; combining codes corresponding to the same pixel coordinates in the coding table corresponding to each light beam so as to obtain a combined coding table; matching the combined coding table with the preset coding table of the structured light stripe pattern to determine a light plane corresponding to each light beam; and performing 3D reconstruction based on the light plane corresponding to each light beam.

According to this embodiment of the present disclosure, if two light beams after spectral splitting are the blue stripe pattern and the green stripe pattern respectively, the 3D reconstruction process may include the following steps: determining codes corresponding to pixels on a stripe center line of the blue stripe pattern according to the preset coding rules to obtain a coding table of the blue stripe pattern, and determining codes corresponding to pixels on a stripe center line of the green stripe pattern according to the preset coding rules to obtain a coding table of the green stripe pattern; combining the codes associated with the same pixel coordinates in the coding table of the blue stripe pattern and the coding table of the green stripe pattern to obtain a combined coding table, matching the combined coding table with a preset coding table of the structured light stripe pattern, and determining a light plane corresponding to each stripe in the blue stripe pattern and a light plane corresponding to each stripe in the green stripe pattern; and performing 3D reconstruction based on each stripe in the blue stripe pattern, the corresponding light plane, and the light plane corresponding to each stripe in the green stripe pattern.

For example, the preset coding rule may be R=0, G=1, and B=2. 27 stripes are arranged as red, red, red, green, red, blue, blue, red, green, green, red, green, blue, red, blue, green, red, blue, blue, green, green, green, blue, red, blue, blue, and green. The coding sequence is {0,0,0,1,0,2,2,0,1, 1,0,1,2,0,2,1,0,2,2,1,1,1,2,0,2,2,1}. In this coding sequence, a sequence formed by any three continuous codes is unique, for example, the first three-digit sequence {0,0,0}, the second three-digit sequence {0,0,1}, . . . , the last three-digit sequence {2,2,1}. Therefore, each three-digit sequence only appears once in the whole coding sequence. Each code can correspond to a stripe of a certain color. Each three-digit sequence can correspond to one stripe in a basic sequence, namely a coding value of one stripe is used for identifying and positioning the stripe. The sequence corresponds to 27 stripes.

In this embodiment of the present disclosure, the three-digit sequence in the sequence corresponds to one stripe and is used as the coding value of the stripe. {0,0,0} is the coding value of the first stripe in the stripe sequence. {0,0,1} is the coding value of the second stripe in the stripe sequence, and so on. That is, the continuous three coding values are used as the serial number of the stripe corresponding to the first coding value. Meanwhile, the continuous three coding values may also be used as the serial number of the stripe corresponding to the second coding value or the third coding value. {0,0,0} is the coding value of the second stripe or the coding value of the third stripe in the stripe sequence.

It is to be noted that the coding table for the blue stripe pattern and the preset coding table for the green stripe pattern each corresponds to a respective standard light plane that may be determined in advance. Therefore, after the codes corresponding to the pixels on the stripe center line of the obtained blue stripes are matched with the coding table for the blue stripe pattern, the light plane corresponding to the blue stripes is determined according to the matching results and the standard light plane. Similarly, after the codes corresponding to the pixels on the stripe center line of the obtained green stripes are matched with the coding table of the green stripe pattern, the light plane corresponding to the green stripes is determined according to the matching result and the standard light plane.

It is to be noted that the above description is the reconstruction method when the image acquisition device in the three-dimensional scanner is a monocular device. If the image acquisition device in the three-dimensional scanner is a binocular device, the three-dimensional scanner acquires left images and right images, determines corresponding stripes according to the numbers of the stripes in the left images and right images, and performs 3D reconstruction on the blue stripes and the green stripes based on the stripes in the left images and right images and calibration camera parameters. Specifically, according to the optical centers of the left cameras and right cameras, the codes corresponding to the pixels on the stripe center line in the blue stripe pattern, and the calibration camera parameters, the corresponding optical plane of the blue stripe pattern are determined. 3D reconstruction is performed based on the optical plane corresponding to the blue stripes. Similarly, according to the optical centers of the left cameras and right cameras, the codes corresponding to the pixels on the stripe center line in the green stripe pattern, and the calibration camera parameters, the corresponding optical plane of the green stripe pattern are determined. Additionally, 3D reconstruction is performed based on the optical plane corresponding to the green stripes.

Further, the method further includes acquiring two light beams after white light scanned by the three-dimensional scanner is spectrally split; and performing texture reconstruction based on the two light beams after splitting the white light and the multiple structured light patterns after spectral splitting.

In this embodiment of the present disclosure, performing texture reconstruction based on the two light beams after spectrally splitting the white light and the multiple split structured light patterns may include: generating a first texture reconstructed image according to a corresponding relationship between pixels in a texture pattern corresponding to the two light beams after spectrally splitting white light; and generating a second texture reconstructed image with texture information according to each light beam after splitting the structured light patterns and the first texture reconstructed image.

In this embodiment of the present disclosure, if the two light beams obtained by splitting white light are the blue texture pattern and the red-green texture pattern, respectively, the texture reconstruction process includes the following specific steps: synthesizing the texture corresponding to each pixel in the white light texture pattern based on the pixel correspondence of the blue texture pattern and the red-green texture pattern; synthesizing the 3D data with texture information based on the pixel correspondence of the blue stripes, green stripes, and the white light texture pattern.

According to the technical solutions of the present disclosure, since the 3D scanner uses colors as spatial coding information, the spatial coding information in a color form is easy to identify, and the identification accuracy is improved. 3D reconstruction and texture reconstruction of the target object can be realized only by a 2D image captured in a single instance, and the reconstruction efficiency of 3D reconstruction and texture reconstruction and the image quality of the reconstructed image can be improved. Moreover, 3D reconstruction is performed by combining the preset coding rule and the preset coding table of the structured light stripe pattern, and texture reconstruction is performed based on the corresponding relationship between pixels in the texture pattern corresponding to two light beams after white light is split and each light beam after the structured light pattern is split, so that a high-quality 3D reconstruction pattern and a high-quality texture reconstruction pattern may be quickly generated. In addition, the quality of the generated 3D reconstructed image and the texture reconstructed image is high, and the generation speed is high, so the image splicing and texture splicing efficiency and splicing precision may be improved.

Embodiment 4

An embodiment provides a storage medium containing computer-executable instructions, and the computer-executable instructions are used for executing a 3D reconstruction method when executed by a computer processor. The method includes:

acquiring multiple split structured light patterns scanned by a three-dimensional scanner; and performing 3D reconstruction based on a preset coding rule, a preset coding table of a structured light stripe pattern, and the multiple split structured light patterns.

Definitely, according to the storage medium containing the computer-executable instructions provided by this embodiment of the present disclosure, the computer-executable instructions are not limited to the method operation above and may also be used for executing related operations in the 3D reconstruction method provided by any embodiment of the present disclosure.

According to the description of the embodiments above, those skilled in the art can clearly know that the present disclosure may be implemented by means of software and necessary general hardware, and may also be implemented through hardware, but the former is a better implementation mode under many conditions. Based on this understanding, the technical solution of the present disclosure or a part contributing to the related art may be embodied in the form of a software product in essence. The computer software product may be stored in a computer-readable storage medium, such as a floppy disk, a Read-Only Memory (ROM), a Random Access Memory (RAM), a FLASH, a hard disk, or an optical disk of a computer, and includes multiple instructions for enabling one computer device (which may be a personal computer, a server or a network device) to execute the 3D reconstruction method provided by each embodiment of the present disclosure.

It is to be noted that the above are only the preferred embodiments of the present disclosure and the technical principles used. Those skilled in the art will appreciate that the present disclosure is not limited to the specific embodiments described herein and that various obvious changes, readjustments, and substitutions can be made by those skilled in the art without departing from the scope of the present disclosure. Therefore, although the present disclosure has been described in detail through the above embodiments, the present disclosure is not limited to the above embodiments and may also include other equivalent embodiments without departing from the concept of the present disclosure, and the scope of the present disclosure is determined by the scope of the appended claims.

INDUSTRIAL APPLICABILITY

The three-dimensional scanners provided by the present disclosure may reduce the hardware cost for the 3D reconstruction method and can perform 3D reconstruction only by acquiring the 2D image in a single instance, thereby improving the reconstruction efficiency of the image to a great extent and having very high industrial practicability.

What is claimed is:

1. A three-dimensional scanner, comprising:
a projection device;
an image acquisition device; and
an optical path adjustment device, wherein the projection device comprises an emitting device, a collimating device, and a pattern forming device;
wherein the emitting device is configured to emit preset light rays, wherein the preset light rays comprise at least two types of monochromatic light rays;
wherein the collimating device is configured to perform uniform illumination processing on the preset light rays;
wherein the pattern forming device is configured to project the preset light rays as a structured light pattern after the uniform illumination processing;
wherein the optical path adjustment device is configured to change a transmission path of the structured light pattern to project the structured light pattern onto a target object, and to project the structured light pattern modulated by the target object onto the image acquisition device; and
wherein the image acquisition device is configured to spectrally split the structured light pattern modulated by the target object and acquire, through different cameras, a plurality of split structured light patterns for three-dimensional reconstruction.

2. The three-dimensional scanner according to claim 1, wherein the emitting device comprises at least two groups of light source modules and at least one color mixing device;
wherein each group of light source modules is configured to emit a type of monochromatic light rays; and
wherein the color mixing device is configured to combine the light rays emitted by the at least two groups of light source modules into an optical path.

3. The three-dimensional scanner according to claim 1, wherein the collimating device comprises at least one compound-eye lens, wherein the compound-eye lens is configured to perform uniform illumination processing on the preset light rays to project the preset light rays to the pattern forming device after the uniform illumination processing.

4. The three-dimensional scanner according to claim 1, wherein the pattern forming device is a color grating sheet; and
wherein the color grating sheet is configured to generate a structured light pattern projected as a stripe pattern through the preset light rays after the uniform illumination processing.

5. The three-dimensional scanner according to claim 1, wherein the image acquisition device comprises a color separating prism, a color camera, and a monochrome camera; and
wherein the color separating prism splits the structured light pattern, wherein one light beam after splitting is monochromatic light rays captured through the monochrome camera, and another light beam after splitting is captured through the color camera.

6. The three-dimensional scanner according to claim 5, further comprising an illumination device, wherein the illumination device is configured to project white light onto the target object; and wherein the optical path adjustment device is further configured to change a transmission path of the white light to reflect the white light onto the target object.

7. The three-dimensional scanner according to claim 6, wherein the color separating prism is further configured to split the white light modulated by the target object;
one light beam after splitting is a monochromatic texture pattern captured through the monochrome camera, and another light beam after splitting is captured through the color camera;
and wherein the two paths of the texture patterns after splitting the white light are used for texture reconstruction.

8. A three-dimensional scanning system, comprising:
a three-dimensional scanner; and
an image processing device in communication connection with the three-dimensional scanner;
wherein the three-dimensional comprises a projection device, an image acquisition device, and an optical path adjustment device;
wherein the projection device comprises an emitting device, a collimating device, and a pattern forming device;
wherein the three-dimensional scanner is configured to:
emit preset light rays through the emitting device;
perform uniform illumination processing on the preset light rays using collimating light;
project, through the pattern forming device, the preset light rays after the uniform illumination processing as a structured light pattern;
change, through the optical path adjustment device, a transmission path of the structured light pattern to project the structured light pattern onto a target object, and wherein the structured light pattern modulated by the target object is projected to the image acquisition device;

spectrally split the structured light pattern modulated by the target object through the image acquisition device;

capture a plurality of split structured light patterns through different cameras for 3D reconstruction, wherein the preset light rays comprise at least two types of monochromatic light rays; and wherein the image processing device is configured to:

receive the plurality of split structured light patterns scanned by the three-dimensional scanner; and perform 3D reconstruction based on the plurality of split structured light patterns.

9. The three-dimensional scanning system according to claim 8, wherein the three-dimensional scanner further comprises an illumination device;

wherein the illumination device is configured to project white light onto the target object;

wherein the optical path adjustment device is further configured to change a transmission path of the white light to reflect the white light onto the target object;

wherein the image acquisition device is further configured to perform spectral splitting on the white light modulated by the target object and perform multi-camera acquisition on the two light beams after spectrally splitting the white light; and correspondingly, the image processing device is further configured to perform texture reconstruction based on the two light beams after spectrally splitting the white light.

10. The three-dimensional scanning system according to claim 9, wherein the image processing device is further configured to:

stitch the 3D reconstructed images obtained by 3D reconstruction to obtain a target reconstructed image of the target object; and map a texture reconstructed image obtained by texture reconstruction to obtain a target texture pattern of the target object.

11. A three-dimensional reconstruction method, comprising:

acquiring a plurality of structured light patterns obtained by a three-dimensional scanner after performing spectral splitting; and performing 3D reconstruction based on preset coding rules, a preset coding table of a structured light stripe pattern, and the plurality of split structured light patterns.

12. The method according to claim 11, wherein performing 3D reconstruction based on the preset coding rules, the preset coding table of the structured light stripe pattern, and the plurality of split structured light patterns comprises:

determining a code corresponding to each light beam after spectrally splitting the structured light patterns according to the preset coding rules to obtain a coding table corresponding to each light beam;

combining codes associated with the same pixel coordinates in the coding table corresponding to each light beam to obtain a combined coding table;

matching the combined coding table with the preset coding table of the structured light stripe pattern to determine a light plane corresponding to each light beam; and performing 3D reconstruction based on the light plane corresponding to each light beam.

13. The method according to claim 11, further comprising:

acquiring two light beams obtained by scanning through the three-dimensional scanner after spectrally splitting white light; and performing texture reconstruction based on the two light beams after spectrally splitting the white light and the plurality of split structured light patterns.

14. The method according to claim 13, wherein performing texture reconstruction based on the two light beams after spectrally splitting the white light and the plurality of split structured light patterns comprises:

generating a first texture reconstructed image based on pixel correspondence in texture images corresponding to the two light beams after spectrally splitting white light; and generating a second texture reconstructed image with texture information according to each light beam after spectrally splitting the structured light patterns and the first texture reconstructed image.

15. The method according to claim 11, further comprising:

emitting preset light rays through an emitting device;

performing uniform illumination processing on the preset light rays using collimating light;

projecting, through a pattern forming device, the preset light rays after the uniform illumination processing as a structured light pattern;

changing, through an optical path adjustment device, a transmission path of the structured light pattern to project the structured light pattern onto a target object, wherein the structured light pattern modulated by the target object is projected to an image acquisition device;

spectrally splitting the structured light pattern modulated by the target object through the image acquisition device;

capturing a plurality of split structured light patterns through different cameras for 3D reconstruction, wherein the preset light rays comprise at least two types of monochromatic light rays; and receiving, by the image processing device, the plurality of split structured light patterns scanned by the three-dimensional scanner.

16. The method according to claim 15, wherein white light is projected onto the target object by the illumination device, wherein a transmission path of the white light is changed by the optical path adjustment device to reflect the white light onto the target object, wherein spectral splitting is performed on the white light modulated by the target object by the image acquisition device, wherein two light beams after spectrally splitting the white light are acquired by a plurality of cameras, and wherein texture reconstruction is performed by the image processing device based on the two light beams after spectrally splitting the white light.

17. The method according to claim 16, further comprising:

stitching the 3D reconstructed images obtained by 3D reconstruction to obtain a target reconstructed image of the target object; and mapping a texture reconstructed image obtained by texture reconstruction to obtain a target texture pattern of the target object.

* * * * *